United States Patent [19]
Eck et al.

[11] Patent Number: 6,114,423
[45] Date of Patent: *Sep. 5, 2000

[54] REDISPERSABLE CROSS-LINKABLE DISPERSION POWDERS

[75] Inventors: Herbert Eck, Bad Toelz; Peter John, Burghausen; Hermann Lutz, Emmerting, all of Germany

[73] Assignee: Wacker-Chemie GmbH, Munich, Germany

[*] Notice: This patent is subject to a terminal disclaimer.

[21] Appl. No.: 08/983,506
[22] PCT Filed: Jul. 18, 1996
[86] PCT No.: PCT/EP96/03161
  § 371 Date: Jan. 20, 1998
  § 102(e) Date: Jan. 20, 1998
[87] PCT Pub. No.: WO97/04013
  PCT Pub. Date: Feb. 6, 1997

[30] Foreign Application Priority Data

Jul. 21, 1995 [DE] Germany .............. 195 26 759

[51] Int. Cl.$^7$ .............. C08F 2/24; C08F 230/08; C08J 3/12
[52] U.S. Cl. .............. 524/265; 524/266; 524/269; 526/279; 156/332
[58] Field of Search .............. 524/547, 559, 524/265, 266, 269; 526/279; 156/332

[56] References Cited

U.S. PATENT DOCUMENTS

| | | | |
|---|---|---|---|
| 3,203,919 | 8/1965 | Brachman | 524/269 |
| 3,706,697 | 12/1972 | Backderf | 526/225 |
| 4,704,416 | 11/1987 | Eck et al. | 524/17 |
| 4,859,751 | 8/1989 | Schulze et al. | 526/200 |
| 4,959,249 | 9/1990 | Schilling et al. | 427/387 |
| 5,210,162 | 5/1993 | Eck et al. | 526/192 |
| 5,214,095 | 5/1993 | Lavoie | 524/806 |
| 5,578,668 | 11/1996 | Colombet et al. | 524/265 |
| 5,608,011 | 3/1997 | Eck et al. | 525/344 |
| 5,641,535 | 6/1997 | Eck et al. | 427/2.14 |
| 5,708,093 | 1/1998 | Bastelberger et al. | 525/288 |
| 5,750,617 | 5/1998 | Eck et al. | 524/718 |
| 5,753,733 | 5/1998 | Eck et al. | 524/265 |

FOREIGN PATENT DOCUMENTS

| | | |
|---|---|---|
| 0149098 | 7/1985 | European Pat. Off. |
| 0485057 | 5/1992 | European Pat. Off. |
| 3727181 | 2/1985 | Germany |
| WO 94/20556 | 9/1994 | WIPO |
| WO 95/20626 | 8/1995 | WIPO |
| WO 95/20627 | 8/1995 | WIPO |

OTHER PUBLICATIONS

W. Noll, Chemie und Technologie der Silicone (Chemistry and Tech–Technology of the Silicones) 2nd Edition (1968), Month unknown, pp. 111–122.

Houben–Weyl, Methoden der organischen Chemie (Methods of Organic Chemistry) vol. E20/111, p. 1782 et seq., (1987) Month unknown.

Dr. Peter Kochs "Polymere mit ... der Polymer Hauptkette" p. 2219 et seq., Dr. Peter Kochs "Polymere ... Hauptkette" Stuttgart (1987) Month unknown.

Houben–Weyl, Methoden der organischen Chemie (Methods of Organic Chemistry) vol. XIV/1, H. Logemann et al Stuttgart (1961) Month unknown, pp. 190–208.

Primary Examiner—Richard D. Lovering
Assistant Examiner—Daniel S. Metzmaier
Attorney, Agent, or Firm—Burgess, Ryan & Wayne

[57] ABSTRACT

A dispersion powder of water-insoluble copolymers of ethylenically unsaturated monomers and optionally, further additives, which are redispersible in water and obtained by:

a) emulsion polymerizing, at a pH of 2 to 9, a comonomer mixture of at least one comonomer selected from vinyl esters of unbranched or branched alkylcarboxylic acids having 1 to 18 carbon atoms, methacrylic acid esters of unbranched or branched alcohols having 1 to 18 carbon atoms, acrylic acid esters of unbranched or branched alcohols having 1 to 18 carbon atoms, olefins, dienes, vinylaromatics and vinyl halides, and 0.05 to 15.0% by weight, based on the total weight of the comonomer mixture, of at least one silicon compound of the formula

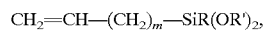

where m=0–8

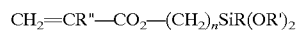

where n=1–6

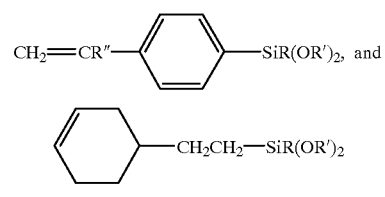

b) spray drying aqueous dispersion, at a pH of 4 to 8 at a discharge temperature of 55 to 100° C., before or after addition of any additives. The dispersion powders are useful as additives for hydraulic binders and binders in coating compositions and adhesives.

12 Claims, No Drawings

REDISPERSABLE CROSS-LINKABLE DISPERSION POWDERS

BACKGROUND OF THE INVENTION

1). Field of the Invention

The invention relates to crosslinkable dispersion powder compositions which are redispersible in water, to processes for their preparation and to their use.

2). Background Art

Dispersion powder compositions which are based on homo- or copolymers of ethylenically unsaturated monomers and are redispersible in water are known. Such a dispersion powder composition is prepared by spray drying the corresponding aqueous plastics dispersions in a stream of hot air. The dispersion powders are suitable as additives for hydraulic binders in the construction materials industry, and furthermore such products are employed as binders in coating compositions or adhesives.

Crosslinkable dispersion powders are known from EP-A 149098 (U.S. Pat. No. 4,859,751). The polymers mentioned therein contain N-methylolacrylamide or N-methylolmethacrylamide units as crosslinking functions. The disadvantages of such polymers are on the one hand that formaldehyde is liberated when N-methylolamide units are crosslinked, but above all N-methylolamide-containing polymers crosslink only in acids, if appropriate by means of addition of crosslinking catalysts. However, the main field of use for crosslinkable dispersion powders which are redispersible in water lies in the building sector; here, it must also be possible for crosslinking of the binder to take place, above all, in the alkaline range.

There was therefore the object of providing crosslinkable dispersion powders which are redispersible in water and also crosslink in the basic range, but without already crosslinking completely during preparation of the dispersion powder, that is to say during the polymerization or drying.

Known vinyl ester copolymers which can also be crosslinked in the basic range are those which contain vinylalkoxysilane units. DE-A 3727181 (U.S. Pat. No. 4,959,249) describes aqueous dispersions of polymers which comprise vinyltrialkoxy- or alkylvinyldialkoxysilanes as crosslinking units. Aqueous copolymer dispersions analogous to these which are based on alkyl acrylate polymers with acryloxyalkyl (trialkoxy) silane units are known from U.S. Pat. No. 3,706,697. The fact that in copolymer dispersions with alkoxysilane units as crosslinking functions these are readily hydrolysed and crosslinked by condensation even at relatively low temperatures of about 50° C. presents problems here.

To prevent premature crosslinking of aqueous dispersions of alkoxysilane-substituted copolymers, EP-A 485057 proposes using aqueous dispersions which, in addition to water-insoluble, alkoxysilane-substituted copolymers, also comprise polar, low molecular weight alkoxysilane copolymers. To improve the storage stability of aqueous dispersions of polymers with alkoxysilane functional units, U.S. Pat. No. 5,214,095 proposes polymerizing these in the presence of condensable siloxane precursors, polysiloxanes which can envelop the alkoxysilane units like protective groups being obtained.

EP-A 493168 relates to dispersion powders obtained by spray-drying a mixture comprising aqueous polymer dispersion and liquid organopolysiloxane.

CH-A 499650 describes a process for preparing polyvinyl ester-based dispersion powders where silica powder is added before spray-drying to the dispersion yet to be dried, in order to prevent caking of the polymer particles in the course of spray-drying.

EP-A 601518 relates to redispersible polymer powders which are based on (meth)acrylates, comprise from 1 to 15% of ethylenically unsaturated comonomer units and are dried in the presence of polyvinyl alcohol as atomizing aid.

Surprisingly, the abovementioned object has been achieved with dispersion powders of copolymers with alkoxysilane functional units, although against the background just discussed, during the required drying of the copolymer dispersions in a temperature range from 55 to 100° C., complete crosslinking of the copolymers had to be expected.

SUMMARY OF THE INVENTION

The invention relates to crosslinkable dispersion powders which are based on water-insoluble copolymers of ethylenically unsaturated monomers and, if appropriate, further additives, such as protective colloids and antiblocking agents, and are redispersible in water, obtainable by a) emulsion polymerization, at a pH of 2 to 9, of a comonomer mixture comprising one or more comonomers from the group comprising vinyl esters of unbranched or branched alkylcarboxylic acids having 1 to 18 C atoms, methacrylic acid esters and acrylic acid esters of unbranched or branched alcohols having 1 to 18 C atoms, olefins, dienes, vinylaromatics and vinyl halides, and 0.05 to 15.0% by weight, based on the total weight of the comonomer mixture, of one or more silicon compounds of the general formulae

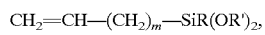

where m=0–8,

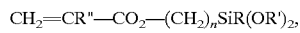

where n=1–6,

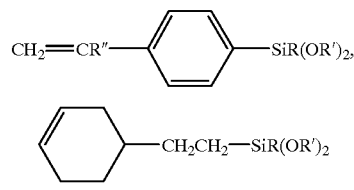

wherein R is a branched or unbranched, optionally substituted $C_1$–$C_{12}$-alkyl radical or a phenyl radical, R' is identical or different and is a branched, unbranched or cyclic, optionally substituted $C_2$–$C_6$-alkyl radical, R" has the meaning H or $CH_3$, and the group —$SiR(OR')_2$ can also have the meaning

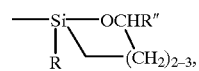

and b) spray drying, at a pH of 4 to 8, the resulting aqueous copolymer dispersion at a discharge temperature of 55 to 100° C., if appropriate before or after addition of the additives mentioned.

DETAILED DESCRIPTION OF THE INVENTION

Preferred vinyl ester comonomers are vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids, for example vinyl esters of α-branched monocarboxylic acids having 9 C atoms (VeoVa9$^R$) or vinyl esters of α-branched monocarboxylic acids having 10 C atoms (VeoVa10$^R$), and vinyl methylnorbornanecarboxylate. Vinyl acetate is particularly preferred.

Preferred acrylic acid esters or methacrylic acid esters are methyl (meth)acrylate, ethyl (meth)acrylate, n-propyl (meth)acrylate, iso-propyl (meth)acrylate, n-butyl (methyl) acrylate, iso-butyl (meth)acrylate, t-butyl (meth)acrylate, hexyl (meth)acrylate, ethylhexyl (meth)acrylate, cyclohexyl (meth)acrylate and dodecyl (meth)acrylate. Methyl acrylate, methyl methacrylate, n-butyl acrylate and 2-ethylhexyl acrylate are particularly preferred.

Suitable comonomers are also the mono- and diesters of fumaric acid and maleic acid. Preferred alkyl radicals in the ester groups for fumaric and maleic acid are methyl, ethyl, iso-propyl, n-propyl, n-butyl, isobutyl, t-butyl, hexyl, ethylhexyl and dodecyl radicals.

Examples of olefins and dienes are ethene, propene and butadiene and isoprene, it being possible for the dienes to be copolymerized, for example, with styrene, (meth)acrylic acid esters or the esters of fumaric or maleic acid. Examples of vinylaromatics are styrene, methylstyrene and vinyltoluene. The preferred vinyl halide is vinyl chloride.

In a preferred embodiment, 0.05 to 15% by weight, based on the total weight of the comonomer mixture, of auxiliary monomers from the group consisting of the ethylenically unsaturated carboxylic acids, preferably acrylic acid, methacrylic acid, crotonic acid, fumaric acid or maleic acid; from the group consisting of ethylenically unsaturated carboxylic acid amides, preferably acrylamides; or from the group consisting of ethylenically unsaturated sulfonic acids and salts thereof, for example vinylsulfonic acid, are also copolymerized during the preparation of the water-insoluble copolymers. If appropriate, up to 2% by weight, preferably up to 0.5% by weight, in each case based on the total weight of the comonomer mixture, of comonomers from the group consisting of poly-ethylenically unsaturated comonomers, for example divinyl adipate, diallyl maleate, allyl methacrylate or triallyl cyanurate, can also be copolymerized.

Suitable auxiliary monomers are, if appropriate, also other comonomers which have a crosslinking action, for example acrylamidoglycolic acid (AGA), methacrylamidoglycolate methyl ether, (MAGME), N-methylolacrylamide (NMAA), N-methylol methacrylamide, allyl N-methylolcarbamate and alkyl ethers, such as isobutyl ether, or esters of N-methylolacrylamide, of N-methylolmethacrylamide or of allyl N-methylolcarbamate, if addition of these for performance reasons provides advantages. If these crosslinking comonomers are copolymerized, they are preferably copolymerized in an amount of 0.05 to 3.0% by weight, based on the total weight of the comonomer mixture.

Particularly preferred silicon compounds are

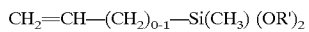

and

wherein

R' is identical or different and is an ethyl, iso-propyl, n-propyl, n-butyl, iso-butyl or t-butyl radical. Preferably, R' is identical and is an n-butyl, iso-butyl, t-butyl or cyclohexyl radical.

Preferred substituted radicals R' are those which are substituted by an alkoxy group. Examples of these are radicals R' having the formula —(CHR''')$_{2-3}$—O—CH$_2$R'', wherein R''' is H, CH$_3$ or C$_2$H$_5$. Particularly preferred substituted radicals R' are the methoxyethylene, ethoxyethylene, methoxypropylene and ethoxypropylene radical and the radical

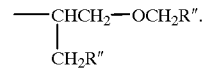

R'' in each case has the abovementioned meaning H or CH$_3$.

The most preferred silicon compounds are vinylmethyl-diisopropoxy-silane, vinylmethyl-di-n-butoxy-silane, vinylmethyl-di-iso-butoxy-silane, vinylmethyl-di-t-butoxy-silane, vinylmethyl-di-cyclohexyloxy-silane, vinylmethyl-di-(1-methoxy-isopropyloxy)-silane.

If the silicon compounds mentioned are not commercially obtainable, they can be prepared by processes known from the literature, such as are described in Noll, Chemie und Technologie der Silicone [Chemistry and Technology of the Silicones], 2nd edition 1968, Weinheim and in Houben-Weyl, Methoden der organischen Chemie [Methods of organic chemistry], volume E20, page 1782 et seq., 2219 et seq., Georg Thieme Verlag, Stuttgart, 1987.

The silicon compounds are preferably copolymerized in an amount of 0.2 to 3.0% by weight, based on the total weight of the comonomer mixture.

Comonomer mixtures or copolymers which, in addition to the silicon compounds mentioned, also comprise the following comonomers or comonomer units are preferred:

vinyl acetate;

vinyl acetate and ethylene with an ethylene content of 5 to 50% by weight;

vinyl acetate and 1 to 30% by weight of vinyl laurate or a vinyl ester of an α-branched carboxylic acid (VeoVa9$^R$ or VeoVa10$^R$) and 5 to 40% by weight of ethylene;

vinyl acetate and 1 to 30% by weight of vinyl laurate or a vinyl ester of an a-branched carboxylic acid (VeoVa9$^R$ or VeoVa10$^R$);

vinyl acetate and 1 to 30% by weight of an acrylic acid ester, in particular n-butyl acrylate or 2-ethylhexyl acrylate;

vinyl acetate, 1 to 30% by weight of an acrylic acid ester, in particular n-butyl acrylate or 2-ethylhexyl acrylate, and 5 to 40% by weight of ethylene;

vinyl acetate, 1 to 30% by weight of vinyl laurate or a vinyl ester of an a-branched carboxylic acid (VeoVa9$^R$ or VeoVa10$^R$), 1 to 30% by weight of an acrylic acid ester, in particular n-butyl acrylate or 2-ethylhexyl acrylate, and 5 to 40% by weight of ethylene;

vinyl chloride, 10 to 40% by weight of ethylene and 5 to 40% by weight of vinyl laurate or a vinyl ester of an α-branched carboxylic acid (VeoVa9$^R$ or VeoVa10$^R$);

methyl methacrylate and 35 to 65% by weight of an acrylic acid ester, in particular n-butyl acrylate and/or 2-ethylhexyl acrylate;

styrene and 35 to 65% by weight of an acrylic acid ester, in particular n-butyl acrylate and/or 2-ethylhexyl acrylate.

The data in % by weight here are in each case based on the total weight of the comonomer mixture or of the copolymer.

The water-insoluble polymers mentioned, which can be polymerized by free radicals, are preferably prepared by the emulsion polymerization process. The polymerization can be carried out discontinuously or continuously, with or without the use of seed latices, by initially introducing all the constituents or individual constituents of the reaction mixture into the reaction vessel, or by initially introducing some of and subsequently metering in the constituents or individual constituents of the reaction mixture into the reaction vessel, or by the metering method without initially introducing constituents. All metering is preferably carried out at the rate of consumption of the particular component(s).

The polymerization is preferably carried out in a temperature range from 0 to 100° C. and is initiated with the water-soluble agents which form free radicals and are usually employed for emulsion polymerization, these preferably being employed in amounts of 0.01 to 3.0% by weight, based on the total weight of the monomers. Examples of these are ammonium and potassium persulfate; hydrogen peroxide and t-butyl peroxide; alkyl hydroperoxides, such as t-butyl hydroperoxide; potassium, sodium and ammonium peroxodiphosphate; and azo compounds, such as azobisisobutyronitrile or azobiscyanovaleric acid. If appropriate, the free radical initiators mentioned can also be combined in a known manner with 0.01 to 1.0% by weight, based on the total weight of the monomers, of reducing agents. Suitable agents are, for example, alkali metal formaldehydesulfoxylates and ascorbic acid. In the case of redox initiation, preferably one or both of the redox catalyst components are metered in during the polymerization.

All the emulsifiers and/or protective colloids usually used for emulsion polymerization can be employed as dispersing agents.

If appropriate, 0.05 to 3.0% by weight, based on the total weight of the monomers, of emulsifier is employed. Suitable emulsifiers are anionic, cationic and nonionic emulsifiers. Suitable emulsifiers are familiar to the expert and are to be found, for example, in Houben-Weyl, Methoden der organischen Chemie [Methods of organic chemistry], volume XIV, 1, Makromolekulare Stoffe [Macromolecular substances], Georg Thieme Verlag, Stuttgart, 1961, 192–208. Those which are not soluble in the protective colloid are preferred.

The polymerization is in general carried out in the presence of a protective colloid, preferably in amounts of from 3 up to 35% by weight, based on the total weight of the monomers. Examples of these protective colloids are polyvinyl alcohols and derivatives thereof, such as vinyl alcohol/vinyl acetate copolymers and polyvinylpyrrolidones; polysaccharides in a water-soluble form, which is preferably partly "degraded" for viscosity reasons, such as starches (amylose and amylopectin), cellulose, tamarind, dextran, alginates and carboxymethyl, methyl, hydroxyethyl and hydroxypropyl derivatives thereof; proteins, such as casein soya protein and gelatin; synthetic polymers, such as poly (meth)acrylic acid, poly (meth)acrylamide, polyvinylsulfonic acids and water-soluble copolymers thereof; and melamine-formaldehydesulfonates, phenol- and naphthalene-formaldehydesulfonates and styrene/maleic acid and vinyl ether/maleic acid copolymers.

The polymerization is carried out at a pH of 2 to 9, preferably 4 to 8, particularly preferably 5 to 7. The pH is brought to 4 to 8, preferably 5.5 to 7, at the latest after the polymerization has ended. The mixture to be atomized should also have this pH.

The dispersion powder composition is prepared by means of spray drying. Drying is carried out in customary spray drying units, it being possible for the atomization to take place by means of one-, two- or multi-component nozzles or using a rotating disc. The discharge temperature is in general chosen in the range from 55° C. to 100° C., preferably 70° C. to 90° C., depending on the unit, the Tg of the resin and the desired degree of drying.

Before the spray drying, the copolymer dispersion obtained after the emulsion polymerization is preferably brought to a solids content of 20 to 60%. The solids content depends on the nature and amount of other additives which are added during the drying. For example, further amounts of protective colloids can also be added to the dispersion. The total amount of protective colloid before the drying operation should be at least 6% by weight, preferably at least 10% by weight, based on the copolymer.

A content of up to 1.5% by weight of antifoam, based on the copolymer, has often proved favorable during the atomization. Liquid antifoams are usually added to the dispersion before drying, and solid antifoams can be mixed into the dry dispersion powder composition.

The average particle size of the dispersion powder particles is in general 1 to 1000 µm, preferably 10 to 700 µm, particularly preferably 50 to 500 µm.

To increase the storage stability by improving the stability to blocking, especially in the case of powders of low glass transition temperature, an antiblocking agent (antibaking agent), preferably in an amount of up to 30% by weight, based on the total weight of polymeric constituents, can be added to the resulting powder. This is preferably carried out as long as the powder is still finely distributed, for example still suspended in the dry gas. In particular, the antiblocking agent is metered into the drying device at least partly separately from but at the same time as the dispersion. Examples of antiblocking agents are finely ground aluminium silicates, kieselguhr, colloidal silica gel, pyrogenic silicic acid, precipitated silicic acid, microsilica, ground gypsum, kaolin, talc, cements, diatomaceous earth, magnesium carbonate and/or calcium carbonate or magnesium hydrosilicate.

Other constituents of the dispersion powder composition which are contained in preferred embodiments are, for example, colorants, fillers, foam stabilizers, hydrophobicizing agents and condensation catalysts. These constituents can be added before or also after the spray drying. The condensation catalyst for accelerating the crosslinking during use is added after the spray drying.

The dispersion powder composition can be employed in the fields of use typical for this. Examples are construction chemical products in combination with inorganic, hydraulically setting binders, such as cements (Portland, aluminate, trass, sheathing, magnesia and phosphate cement), gypsum and water-glass, for the production of construction adhesives, plasters, stopper compositions, flooring stopper compositions, joint mortars and paints; furthermore as sole binders for coating compositions and adhesives or as binders for textiles. The dispersion powder composition is preferably employed as a binder in fields of use in which, in addition to good adhesion, a reduced water uptake and/or good resistance to solvents is also desired.

The redispersion powders according to the invention are products which are at most slightly crosslinked, are readily redispersible in water and form mechanically strong, crosslinked films when used in powder form or as an aqueous dispersion. In contrast to the doctrine of the prior art, these products are accessible without the need for cocondensation of siloxanes during the free radical polymerization.

EXAMPLES

General instructions for the examples and comparison examples listed in Table 1 with the resin base of vinyl acetate/n-butyl acrylate:

In a heat-stabilized 1.5 l tank fitted with a stirrer and thermometer, after introduction of 545 g of water, 36.5 g of polyvinyl alcohol G 04/140 (Wacker-Chemie GmbH, Munich) and 60 g of a monomer mixture of 437.8 g of vinyl acetate, 158.0 g of n-butyl acrylate and silane (nature and amount according to Example 1), the initial mixture was heated to 65° C. The catalyst solutions, a 3.4% strength aqueous t-butyl hydroperoxide solution and a 5% strength aqueous sodium formaldehyde-sulfoxylate solution (1:1), were then introduced. Five minutes after the start of the reaction, metering of the remaining amount of the monomer mixture was started. The duration of the metering was about two hours. The pH during the polymerization and before the atomization is shown in Table 1.

When the reaction had subsided, after-polymerization was carried out three times with 1 ml of 10% strength $H_2O_2$ solution each time. The solids content was between 48.5 and 50.0%. The residual monomer content was about 0.3%.

In comparison example 3 and in example 2, the silane was metered in together with the last 40% of the vinyl acetate/butyl acrylate mixture. In comparison example 1, no silane was incorporated. This was used for determination of the "0 value" for the degree of crosslinking.

Before the atomizing operation, 10% by weight (solid for solid) of polyvinyl alcohol M 13/140 (Wacker-Chemie GmbH, Munich) was admixed to the dispersion in the form of an 11% strength aqueous solution, and the mixture was diluted to 33% strength with water.

The dispersions were atomized in a Nubilosa spray drier under the following conditions.

| Intake temperature: | about 112° C. |
|---|---|
| Discharge temperature: | 80° C. |
| Compressed air pressure upstream of the 2-component nozzle: | 4 bar |
| Throughput: | 1.5 l/hour |

After the atomization, 10% by weight, based on the spray-dried product, of a commercially available antiblocking agent was incorporated into the powder. The dry powder was very readily free-flowing and very readily redispersible in water.

To determine the crosslinking, the contents soluble in tetrahydrofuran were determined from about 500 mg of the dispersion film or of the powder. The components insoluble in tetrahydrofuran, the polyvinyl alcohol and antiblocking agent, were deducted from the weight before the calculation. The difference between the soluble contents and the total amount of water-insoluble resin content weighed is stated in the table as "% crosslinking".

The results are summarized in Table 1: the product from comparison example 1 is non-crosslinked since it comprises no silane content. The value of 57% insoluble in THF is caused by the fact that the particles are enclosed by the atomizing aid polyvinyl alcohol. This value can therefore be used as a reference value for evaluating the crosslinking of silane-containing polymers during polymerization or spray drying.

While the polymers of comparison examples 2 and 3, which are not silane-substituted according to the invention, are crosslinked completely after the spray drying, no significant crosslinking can be detected in examples 2 and 3, and only slight initial crosslinking can be detected in example 1.

TABLE 1

| Example | Silane monomer | % by weight of silane | pH Polymerization | pH Atomization | THF-insoluble % by weight* |
|---|---|---|---|---|---|
| Comparison example 1 | — | — | 5.5 | 6.0 | 57.0** |
| Comparison example 2 | Vinyltriethoxy | 2.0 | 6.0 | 6.0 | 98.5 |
| Comparison example 3 | Vinylmethyl-di-n-butoxy | 2.6 | 2.5 | 2.5 | 96.0 |
| Example 1 | Vinylmethyl-diethoxy- | 2.0 | 5.5 | 6.0 | 77.0 |
| Example 2 | Vinylmethyl-di-n-butoxy | 2.6 | 5.5 | 6.0 | 65.0 |
| Example 3 | Vinylmethyl-di-i-butoxy- | 2.6 | 5.5 | 6.0 | 61.0 |

*minus the additives insoluble in THF, such as polyvinyl alcohol and Hydrite
**blank value: the product is non-crosslinked. It seems to be only partly insoluble in THF (in this case 57%) because it is enclosed by polyvinyl alcohol.

General instructions for the examples and comparison examples listed in Table 2 with the resin base vinyl acetate/ethylene:

4,630 g of water, 78 g of polyvinylalcohol W 25/140 (Wacker-Chemie GmbH, Munich) and 230 g of polyvinylalcohol M 05/140 (Wacker-Chemie GmbH, Munich), 800 g of ethylene and a portion of a monomer mixture of 2,430 g of vinylacetate and silane (type and amount according to Table 2) were initially introduced into a 15 l stirred autoclave and the initial mixture was heated to 50° C. The catalyst solutions, a 6.0% strength aqueous sodium persulfate solution and a 3% strength aqueous sodium formaldehyde-sulphoxylate solution (1:1), were now introduced. After a reaction time of 1 hour, metering of the remaining amount of the vinyl acetate/silane mixture was started. The duration of metering was about 5 hours. After an after-polymerization of 2 hours, the autoclave was let down. The solids content was between 50 and 51%. The residual monomer content was about 0.3%.

No silane was incorporated in the comparison examples 4 and 5. These were used to determine the "0 value" for powder solubility and film crosslinking.

Before the spraying operation, 10% by weight (solid for solid) of polyvinylalcohol M 13/140 (Wacker-Chemie GmbH, Munich) was admixed to the dispersion in the form of an 11% strength aqueous solution and the mixture was diluted to 33% with water.

The dispersions were sprayed in a Nubilosa spray dryer under the abovementioned conditions.

Test Methods:

The solubility of the dispersion powders was determined analogously to the determination in Table 1, with the difference that dimethylformamide was employed as the solvent and the solubility was evaluated qualitatively.

In addition, the crosslinkability of films which are obtained by redispersing the powder in water under acid or basic conditions was tested.

To investigate the crosslinkability under basic conditions, 90 parts of dispersion powder were redispersed in water together with 10 parts of calcium hydroxide. To investigate the crosslinkability under acid conditions, 90 parts of dispersion powder were redispersed in water and a pH of 2.0 was established with HCl.

Films were cast with the redispersions thus obtained and their solubility in dimethylformamide was evaluated qualitatively.

The results are summarized in Table 2:

The products of comparison examples 4 and 5, without a silane content, were completely soluble in dimethylformamide. Films produced with these crosslinked neither under acid nor under basic conditions.

The products of examples 4, 5 and 6 were completely soluble in dimethylformamide. The films produced with these crosslinked both under acid and under basic conditions.

TABLE 2

| Example | Silane monomer | % by weight of silane | pH Polymer-ization | pH Atomization | Solubility of the powders in DMF | Acid/Base addition to the redispersion | Solubility of the film in DMF |
|---|---|---|---|---|---|---|---|
| Comparison Example 4 | — | — | 5.5 | 6.9 | clear solution | Ca(OH)$_2$ | dissolved completely |
| Comparison Example 5 | — | — | 5.5 | 6.9 | clear solution | HCl | dissolved completely |
| Example 4 | Vinyl-methyl-di-ethoxy- | 4.0 | 5.6 | 5.9 | cloudy solution | Ca(OH)$_2$ | film swollen |
| Example 5 | Vinyl-methyl-dipropoxy- | 3.0 | 5.3 | 6.9 | cloudy solution | Ca(OH)$_2$ | film broken up and swollen |
| Example 6 | Vinyl-methyl-di-i-butoxy | 2.5 | 6.0 | 6.9 | clear solution | HCl | film slightly swollen |

What is claimed is:

1. A crosslinkable dispersion powder comprising water-insoluble copolymers of ethylenically unsaturated monomers and, optionally, further additives which are redispersible in water obtained by a) emulsion polymerizing, at a pH of 2 to 9,
  (i) a comonomer mixture comprising at least one comonomer selected from the group consisting of vinyl esters of unbranched or branched alkylcarboxylic acids having 1 to 18 carbon atoms, methacrylic acid esters of unbranched or branched alcohols having 1 to 18 carbon atoms, acrylic acid esters of unbranched or branched alcohols having 1 to 18 carbon atoms, olefins, dienes, vinylaromatics and vinyl halides, and
  (ii) 0.05 to 15.0% by weight, based on the total weight of the comonomer mixture, of at least one silicon compound of the formula $$CH_2=CH-(CH_2)_m-SiR(OR')_2,$$

where m=0–8, $$CH_2=CR''-CO_2-(CH_2)_n SiR(OR')_2$$

where n=1–6,

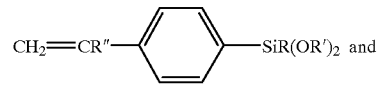 SiR(OR')$_2$ and

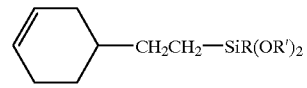

wherein R is a branched or unbranched $C_1$–$C_{12}$ alkyl group or a phenyl group, R' is an identical or different branched, unbranched or cyclic $C_2$–$C_6$ alkyl group, optionally substituted with a $C_1$–$C_2$ alkoxy group, or two R's within the formula SiR(OR')$_2$ forming a bridge having the formulas

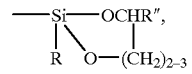

wherein R'' is H or CH$_3$, to form an aqueous dispersion; and b) spray drying said aqueous dispersion, at a pH of 4 to 8 at a discharge temperature of 55 to 100 C, before or after addition of any additive.

2. The dispersion powder according to claim 1, wherein the at least one silicon compound is one or more silicon compounds of the formulae:

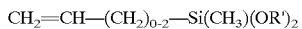

and

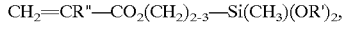

wherein
R' is identical or different and R' is an ethyl, iso-propyl, n-propyl, n-butyl, iso-butyl, t-butyl, cyclohexyl radical, or is an alkyl radical having the formula —(CHR''')$_{2-3}$—O—CH$_2$R''; wherein R''' is H, CH$_3$ or C$_2$H$_5$; R'' in each case has the meaning H or CH$_3$.

3. The dispersing powder according to claim 1 wherein the comonomer mixture comprises one or more silicon compounds selected from the group consisting of vinylmethyl-diisopropoxy-silane, vinylmethyl-di-n-butoxy-silane, vinylmethyl-di-iso-butoxy-silane, vinylmethyl-di-t-butoxy-silane, vinylmethyl-di-cyclohexyloxy-silane and vinylmethyl-di-(1-methoxy-isopropyloxy)-silane.

4. The dispersion powder according to claim 1 wherein the comonomer mixture comprises the silicon compounds in an amount of 0.2 to 3.0% by weight, based on the total weight of the comonomer mixture.

5. Dispersion powders according to claim 1, wherein the acrylic acid ester is selected from the group consisting of n-butyl acrylate and 2-ethylhexyl acrylate.

6. The dispersion powder of claim 1 wherein, in addition to the silicon compounds, the at least one comonomer in the comonomer mixture consists of vinyl chloride, 10 to 40% by weight of ethylene and 5 to 40% by weight of at least one monomer selected from the group consisting of vinyl laurate and a vinyl ester of an α-branched carboxylic acid having 9–10 carbon atoms.

7. The dispersion powder of claim 1 wherein, in addition to the silicon compounds, the at least one comonomer in the comonomer mixture consists of at least one member selected from the group consisting of methyl methacrylate and 35 to 65% by weight of an acrylic acid ester, and styrene.

8. The dispersion powder of claim 1 wherein at least one comonomer is selected from the group consisting of mono or di-esters of fumaric acid with alcohols having from 1 to 12 carbon atoms and mono- and di-esters of maleic acid with alcohols having from 1 to 12 carbon atoms.

9. The dispersion powder of claim 1 wherein, in addition to the silicon compounds, the one or more comonomers in the comonomer mixture is selected from the group consisting of vinyl acetate; vinylacetate and ethylene with an ethylene content of 5 to 50% by weight; vinylacetate and 1 to 30% by weight of at least one member selected from the group consisting of vinyl laurate and a vinylester of an α-branched carboxylic acid having 9–10 carbon atoms; and 5 to 40% by weight of ethylene vinyl acetate and 1–30% by weight of at least one member selected from the group consisting of vinyl laurate and a vinylester of an α-branched carboxylic acid having 9–10 carbon atoms vinyl acetate, and 1 to 30% by weight of an acrylic acid ester; vinyl acetate, 1 to 30% by weight of an acrylic acid ester and 5 to 40% by weight of ethylene; and vinylacetate, 1 to 30% by weight of at least one member selected from the group consisting of vinyl laurate and a vinyl ester of an α-branched carboxylic acid having 9 or -10 carbon atoms, 1 to 30% by weight of an acrylic acid ester and 5 to 40% by weight of ethylene.

10. Dispersion powders according to claim 9, wherein the acrylic acid ester is selected from the group consisting of n-butyl acrylate and 2-ethylhexyl acrylate.

11. A process for the preparation of crosslinkable dispersion powders which are redispersible in water according to claim 1 which comprises:

a) polymerizing, under free radical emulsion polymerization conditions, at a temperature of 0 to 100 C and at a pH of 2 to 9, a comonomer mixture comprising at least one comonomer selected from the group consisting of vinyl esters of unbranched or branched alkylcarboxylic acids having 1 to 18 carbon atoms, methacrylic acid esters of unbranched or branched alcohols having 1 to 18 carbon atoms, an acrylic acid ester of unbranched or branched alcohols having 1 to 18 carbon atoms, olefins, dienes, vinylaromatics and vinyl halides, and 0.05 to 15% by weight, based on the total weight of the comonomer mixture, of at least one silicon compound of the formula

where m=0–8,

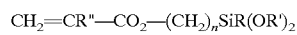

where n=1–6,

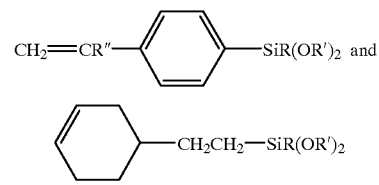

wherein R is a branched or unbranched $C_1$–$C_{12}$ alkyl group or a phenyl radical, R' is an identical or different branched, unbranched or cyclic $C_2$–$C_6$ alkyl group, optionally substituted with a $C_1$–$C_3$ alkoxy group, or two R's within the formula $SiR(OR')_2$ forming a bridge having the formula

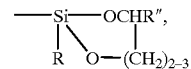

and R" is H or $CH_3$, to form an aqueous dispersion; and b) spray drying said aqueous dispersion, at a pH of 4 to 8 at a discharge temperature of 55 to 100 C, before or after addition of any additive.

12. A method of adhering substrates which comprises applying to at least one substrate, an adhesive containing the dispersion powder of claim 1 and joining the substrate.

* * * * *